Feb. 7, 1928.
W. O. VIVARTTAS
MOLDING MACHINE
Filed Feb. 18, 1927
1,658,146
2 Sheets-Sheet 1
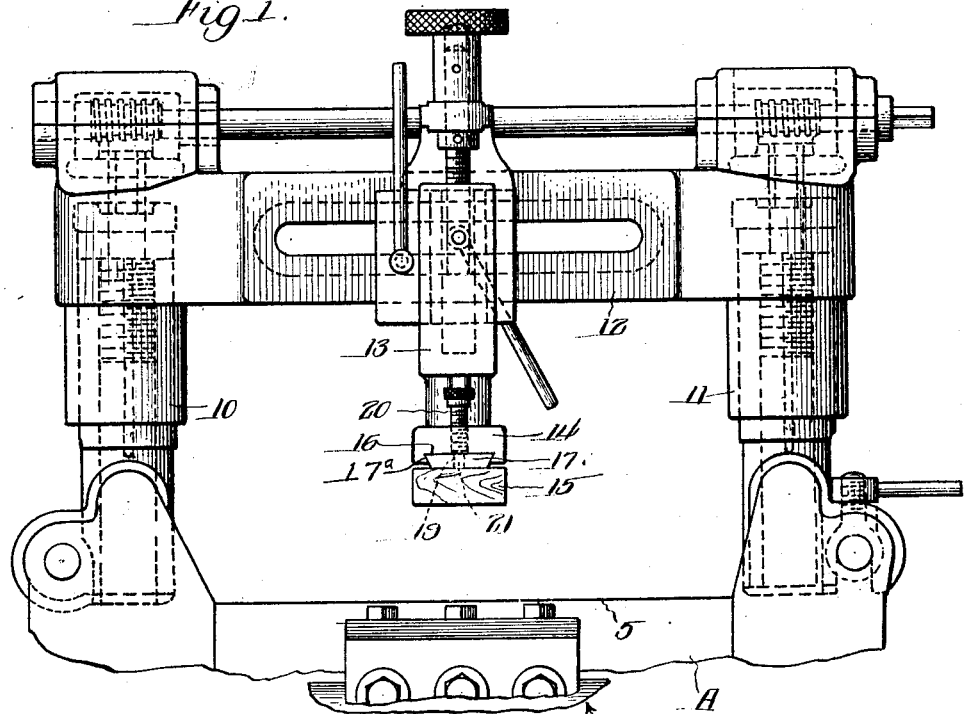
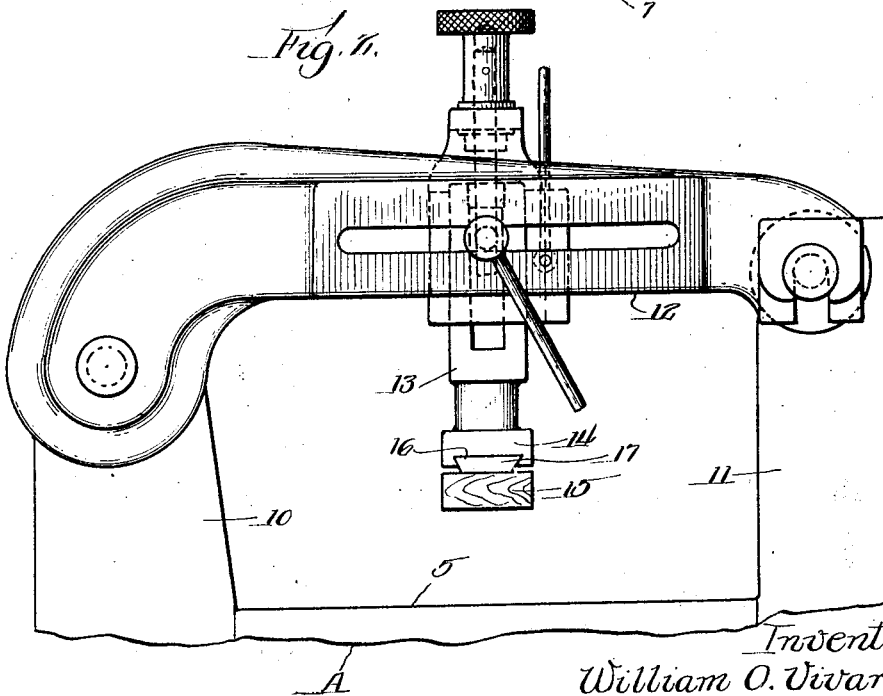
Inventor:
William O. Vivarttas,
By Lindahl Parker & Carlson
Attys.

Feb. 7, 1928.
W. O. VIVARTTAS
MOLDING MACHINE
Filed Feb. 18, 1927
1,658,146
2 Sheets-Sheet 2
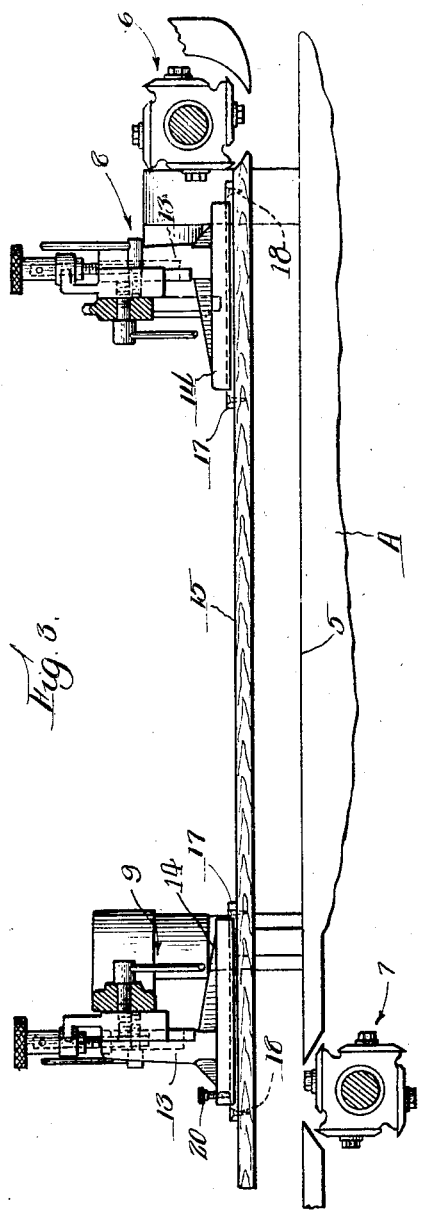
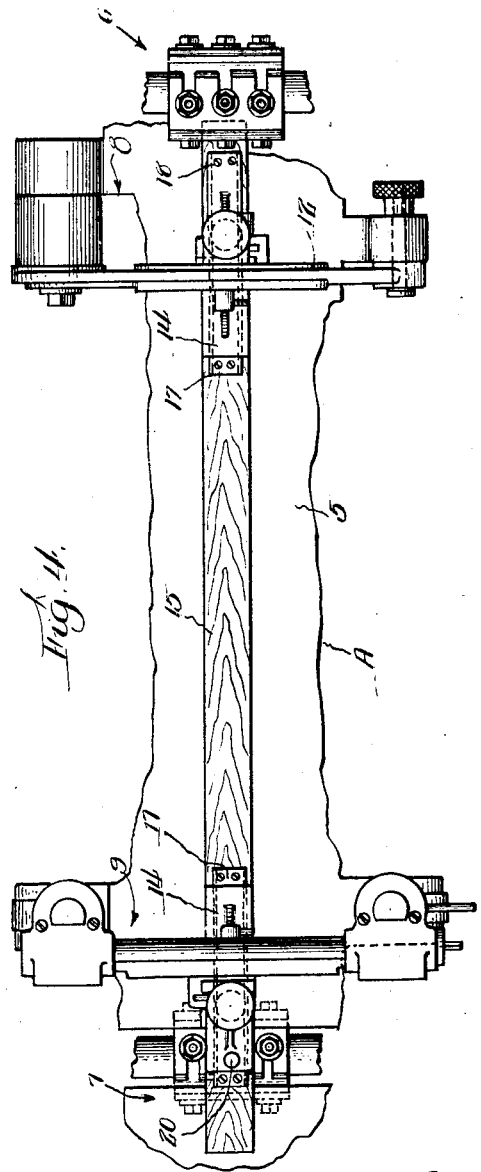
Inventor:
William O. Vivarttas,
By Ginsell Parker & Carlson
Attys.

Patented Feb. 7, 1928.

1,658,146

UNITED STATES PATENT OFFICE.

WILLIAM O. VIVARTTAS, OF ROCKFORD, ILLINOIS, ASSIGNOR TO MATTISON MACHINE WORKS, OF ROCKFORD, ILLINOIS, A CORPORATION OF ILLINOIS.

MOLDING MACHINE.

Application filed February 18, 1927. Serial No. 169,405.

This invention relates generally to improvements in molding machines, and more particularly to a work guiding means for such a machine.

In molding machines of the type in which a power driven feeding device propels a piece of work into position to be progressively operated upon by a number of cutters, it is customary to provide a means, generally known as a pressure bar, to hold the work firmly against the bed of the machine while the work is being operated upon by the cutters. In former instances, such pressure bars have been constructions requiring considerable time and labor to attach and detach them from their supporting members. One object of this invention has been the provision of a pressure bar which would overcome this objectionable feature.

In the past the bars generally have been attached directly to the supporting means therefor as by means of screws or the like and it has been found that the wear of frequent attaching and detaching has been cumbersome, inaccurate and has greatly shortened the life of the bar. Another object of this invention, therefore, is to provide an improved means for rapidly effecting the attaching and detaching of the pressure bar to and from its supports, which means is durable, eliminates the unnecessary wear and consequently lengthens the useful life of the bar.

Other objects and advantages will become apparent from the following description and the accompanying drawings, in which:

Figures 1 and 2 are elevational views of the rear and front pressure bar supports respectively in a molding machine, with the pressure bar mounted thereon.

Fig. 3 is a fragmentary longitudinal elevation of the supports and bar of Figs. 1 and 2, showing their position relative to the upper and lower cutter heads of the machine.

Fig. 4 is a fragmentary plan view of the supports and pressure bar.

As the invention is capable of being incorporated in machines of this type, I have shown very generally a machine bed A having an upper surface 5 over which a piece of work to be operated upon travels. An upper cutter head 6 and a lower cutter head 7 are positioned at appropriate points along the bed and may be driven in any preferred manner. The usual side cutters and guides (not shown) may also be mounted along the bed. Also spaced along the bed are front and rear pressure bar support frames 8 and 9 respectively, each comprising upright standards 10 and 11 rising from either side of the machine bed and a horizontal cross bar 12 supported thereby. Preferably each support frame is pivotally mounted relative to the bed to permit swinging movement of the frames to an out of the way position.

Mounted upon each of the cross bars 12 for sliding adjustment longitudinally thereof are depending posts 13 each of which carry at its lower end a pressure shoe 14 arranged to extend along and substantially parallel to the bed of the machine.

The means in which I prefer to attain the objects of the invention comprises a quickly detachable means for effecting an engagement between the shoes 14 on the depending posts 13 and a suitable pressure bar 15. Thus in the preferred form of the invention each shoe 14 is provided with a longitudinally extending dovetail slot or groove 16 in the lower surface thereof. The pressure bar 15, which is generally formed of wood or the like, and with a bottom surface adapted to engage the upper finished surface of the work passing through the machine, has a pair of attachment plates 17 permanently secured thereto at appropriate points upon one surface of the pressure bar, as by means of the screws 18. These plates are provided with beveled edges 17$^a$ complementary to the walls of the slot 16. Thus by inserting the plates 17 on the pressure bar 15 into the corresponding dovetail grooves 16 on the pressure shoes 14 the bar may be quickly and readily mounted in a manner which prevents any vertical or transverse displacement thereof. Longitudinal movement may be prevented by a suitable locking means which in this instance (Fig. 1) comprises a socket 19 in one of the attachment plates, preferably the rear one, arranged to be engaged by a pin 20 upon the corresponding shoe. The pin comprises a knurled headed screw mounted in the shoe which screw has a reduced end 21 extending into the dovetail slot 16 in a position to engage the socket 19 in the plate. Hence all that is necessary to lock the pressure bar in position is to move the bar into a position where in the reduced end of the screw may be inserted into the socket and then to tighten the screw. By predetermining the exact position of the plate and the socket relative to the pressure bar, the correct positioning of the pressure bar in the machine is obtained.

Obviously for variations in the sizes and shapes of material to be worked on, interchangeable pressure bars of various forms are required. The simple mounting herein disclosed permits such changes to be made with maximum ease and rapidity. The ease of detachment also permits the pressure bar to be readily removed during changes or adjustments in the machine to permit greater freedom of access thereto.

It will be apparent that a pressure bar has been provided in which the maximum life of a bar is assured due to the durability of the means by which it is mounted. Moreover the ease of removal and replacement of the bar in the machine, the economy of manufacture and assembly and the simplicity of construction are salient features of this device.

I claim as my invention:

1. In a molding machine, the combination of a bed having a surface over which the work passes through the machine, means for holding a piece of work against said surface during the travel of the work thereover comprising a pressure bar, and means to support said bar comprising a pair of supports spaced longitudinally of the bed, said pressure bar being mounted on said supports to overlie said surface, and means for securing said pressure bar on said supports for ready removal therefrom, said means comprising a pair of metallic attachment plates permanently secured on said bar, a supporting shoe on each of said supports, said shoes having complementary surfaces arranged to interengage when the bar is in its normal position on the supports, and locking means detachably securing said bar to the supports.

2. In a molding machine, the combination with a machine bed, of a detachable pressure bar supported to extend longitudinally of and spaced from said bed, a pair of attachment plates having beveled edges secured to said bar, means for supporting said bar including a pair of supporting shoes mounted on said bed in longitudinally spaced relation, said shoes having dovetailed slots therein arranged to receive said attachment plates to position said bar relative to said bed, and means on one of said shoes operable to engage one of said plates to lock said bar on said shoes in predetermined relation with respect to said bed.

3. In a molding machine, the combination with a bed having a surface over which the work passes, of means for holding the work against said surface as the work passes through the machine, said means comprising a pressure bar adapted to engage the work, a plurality of supporting shoes mounted upon said bed, and means to secure said bar detachably to said shoes, said means including an attaching plate for each shoe permanently secured to said bar, each of said shoes embodying means to engage one of said plates to position said bar relative to said surface.

In testimony whereof, I have hereunto affixed my signature.

WILLIAM O. VIVARTTAS.